United States Patent
DeHart

(10) Patent No.: US 9,670,741 B2
(45) Date of Patent: Jun. 6, 2017

(54) THREADED CONNECTION

(71) Applicant: Marubeni-Itochu Tubulars America Inc., Houston, TX (US)

(72) Inventor: Cody Allen DeHart, Porter, TX (US)

(73) Assignee: Marubeni-Itochu Tubulars America, Inc., Houston, TX (US)

( * ) Notice: Subject to any disclaimer, the term of this patent is extended or adjusted under 35 U.S.C. 154(b) by 123 days.

(21) Appl. No.: 14/570,214

(22) Filed: Dec. 15, 2014

(65) Prior Publication Data

US 2015/0167869 A1    Jun. 18, 2015

Related U.S. Application Data

(60) Provisional application No. 61/916,621, filed on Dec. 16, 2013.

(51) Int. Cl.
*F16L 25/00* (2006.01)
*E21B 17/042* (2006.01)
*F16L 15/00* (2006.01)
*F16L 15/06* (2006.01)

(52) U.S. Cl.
CPC .......... *E21B 17/042* (2013.01); *F16L 15/004* (2013.01); *F16L 15/06* (2013.01)

(58) Field of Classification Search
CPC ........ E21B 17/042; F16L 15/06; F16L 15/004
USPC .................................................. 285/334, 27
See application file for complete search history.

(56) References Cited

U.S. PATENT DOCUMENTS

| | | | | |
|---|---|---|---|---|
| 1,927,656 A | * | 9/1933 | Eaton | E21B 17/0423 285/115 |
| 2,062,407 A | * | 12/1936 | Eaton | E21B 17/08 285/27 |
| 2,183,644 A | * | 12/1939 | Frame | E21B 17/042 285/333 |
| 3,508,771 A | * | 4/1970 | Duret | E21B 17/042 285/334 |

(Continued)

FOREIGN PATENT DOCUMENTS

| JP | 58187684 A | 11/1983 |
|---|---|---|
| WO | 2006092649 A1 | 9/2006 |

OTHER PUBLICATIONS

The International Search Report and The Written Opinion of the International Searching Authority dated Jun. 17, 2015; International Application No. PCT/US2014/070329; International Filing Date: Dec. 15, 2014.

(Continued)

*Primary Examiner* — Basil Katcheves
*Assistant Examiner* — Joshua Ihezie
(74) *Attorney, Agent, or Firm* — Bracewell LLP; Constance G. Rhebergen; Kevin R. Tamm

(57) ABSTRACT

A threaded connection having a straight central axis, the connection including a plurality of pin threads, each pin thread having a root and a crest, and a box having a plurality of box threads, each box thread having a root and a crest. The crests of at least a portion of the box threads are curved so that when the pin threads are fully engaged with the box threads, there is a void between the roots of the pin threads and the corresponding curved crests of the box threads to reduce standoff caused by lubricant or other fluids becoming trapped between the threads as the connection is made up.

19 Claims, 7 Drawing Sheets

(56) References Cited

U.S. PATENT DOCUMENTS

| | | | | |
|---|---|---|---|---|
| 4,494,777 A * | 1/1985 | Duret | E21B 17/042 | 285/334 |
| 4,822,081 A * | 4/1989 | Blose | F16L 15/003 | 285/334 |
| 5,454,605 A * | 10/1995 | Mott | F16L 15/06 | 285/333 |
| 5,462,315 A * | 10/1995 | Klementich | E21B 17/0423 | 285/24 |
| 5,498,035 A * | 3/1996 | Blose | F16L 15/004 | 285/328 |
| 5,505,502 A * | 4/1996 | Smith | E21B 17/085 | 285/334 |
| 5,687,999 A * | 11/1997 | Lancry | E21B 17/0423 | 285/333 |
| 6,322,110 B1 * | 11/2001 | Banker | E21B 17/042 | 285/333 |
| 6,848,724 B2 * | 2/2005 | Kessler | F16L 15/004 | 285/333 |
| 2004/0155465 A1 * | 8/2004 | Noel | F16L 15/004 | 285/334 |
| 2009/0200798 A1 * | 8/2009 | Hamamoto | E21B 17/042 | 285/334 |
| 2011/0012349 A1 * | 1/2011 | Church | E21B 17/042 | 285/334 |
| 2012/0298249 A1 * | 11/2012 | Banker | E21B 17/042 | 138/177 |

OTHER PUBLICATIONS

Partial International Search Report for related PCT application PCT/US2014/070329 dated Mar. 16, 2015.

* cited by examiner

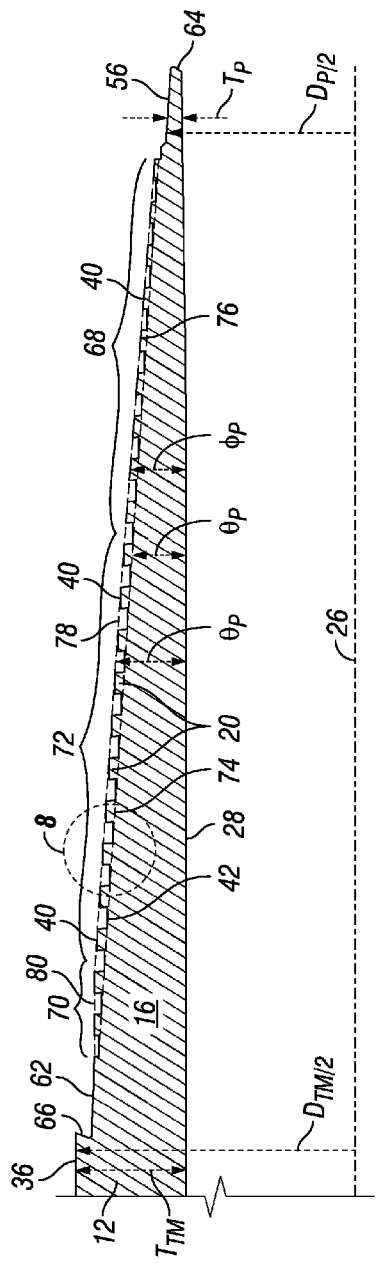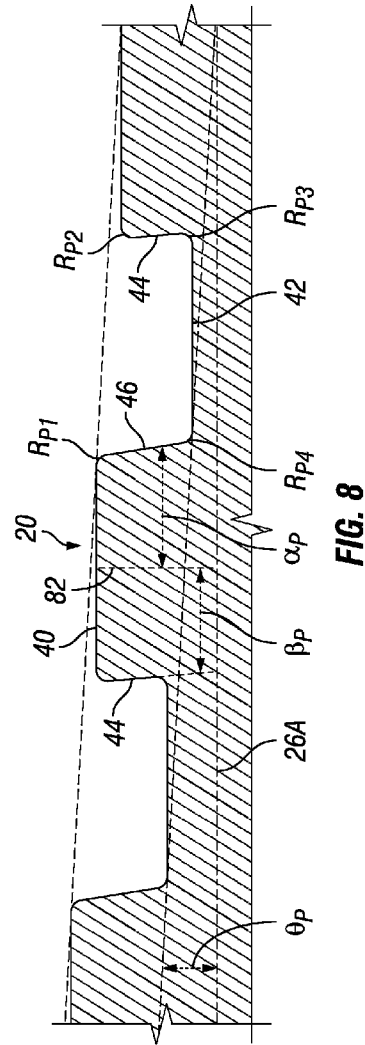
FIG. 7
FIG. 8

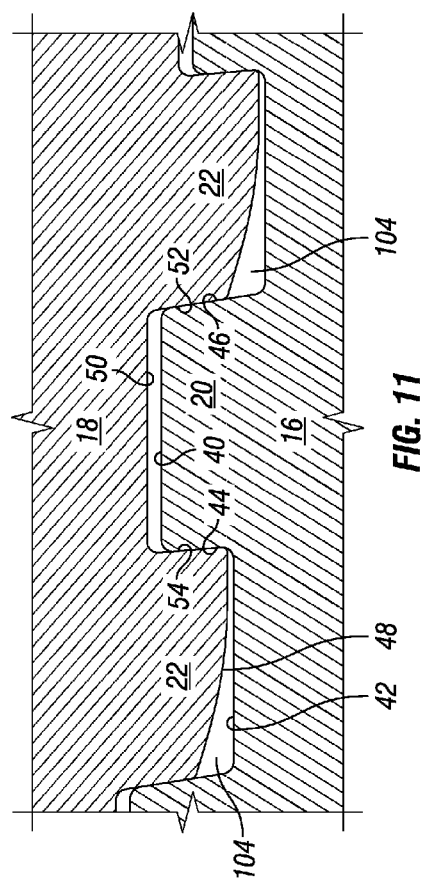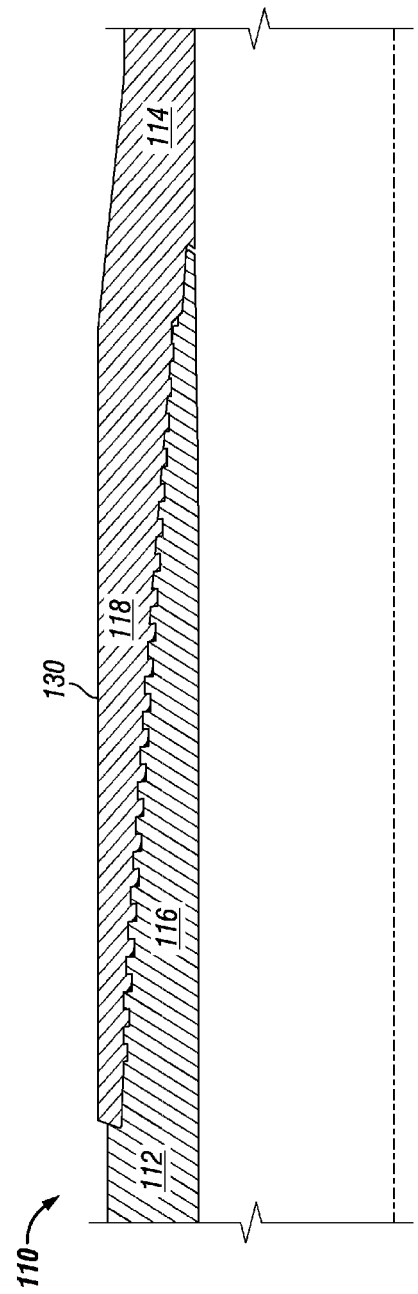

THREADED CONNECTION

This application claims priority to and the benefit of U.S. Provisional Patent Application Ser. No. 61/916,621, which was filed Dec. 16, 2013, the fell disclosure of which is hereby incorporated herein by reference in its entirety.

FIELD OF THE INVENTION

The present technology relates, to threaded connections for pipes, and in particular to threaded connections for pipes that carry oil and gas and that have an increased ability to withstand stress forces.

BACKGROUND

Pipes used, for example, in oilfield pipelines, have been joined end-to-end to transport oil or other fluids from place to place. Typically, the ends of the pipes are joined by threading together the male end of one of the pipes, known as a pin, with the female end of the other pipe (known as the box). There are a number of different types of connections. Some connections are known as integral flush connections, wherein the connection is machined into the pipe body, without adding any additional material, or up-setting, when joining the two pieces of pipe. The result is a connection having an outer diameter that is flush with the outer diameter of the pipes, and an inner diameter that is flush with the inner diameter of the pipes. Most integral flush connections have a tension efficiency of about 68% to about 72%.

The term "tension efficiency," which is sometimes also referred to as "tensile efficiency," generally refers to the tensile strength of the threaded connection divided by the tensile strength of the pipe body itself. Furthermore, the term "tension efficiency" may also be used to refer to the critical cross-sectional area divided by the area of the pipe body. One reason that tension efficiency is limited to about the range described above, is because when an integral flush connection is machined, material is cut away from the pipe end to form the flush connection, which leads to a thinner pipe at the connection compared to the rest of the pipe body.

In threaded connections, there is typically a weak point, which is the point where the connection is most likely to fail. This weak point is typically the last engaged thread of the connection, also referred to as the "critical cross section." On a flush connection, the critical cross section is most always on the box. One way to increase the strength of a connection, therefore, is to minimize the stresses in the last engaged thread.

SUMMARY OF THE INVENTION

One embodiment of the present technology provides a threaded connection having a straight central axis. The connection includes a pin having an external pin seal surface and an internal pin seal surface, the external and internal pin seal surfaces separated by a run-in pin thread portion, a perfect pin thread portion, and a run-out pin thread portion, each pin thread portion having a plurality of pin threads, each pin thread having a root, a crest, a stab flank, and a load flank, the depth of each pin thread determined by the distance between the root and the crest, and the width of each pin thread determined by the distance between the stab flank and the load flank. According to one embodiment, the roots of adjacent pin threads align along a pin taper plane that is angled relative to the central axis of the connection, the crests of adjacent pin threads of the run-in pin thread portion align along a pin run-in plane that is angled relative to the central axis of the connection and the pin taper plane, the crests of adjacent pin threads of the perfect pin thread portion align along a pin perfect plane that is substantially parallel to the pin taper plane, and the crests of adjacent pin threads of the run-out pin thread portion align along a pin run-out plane that is substantially parallel to the central axis of the connection, and angled relative to the pin taper plane.

The connection also includes a box having an internal box seal surface and an external box seal surface, the external and internal box seal surfaces separated by a run-in box thread portion, a perfect box thread portion, and a run-out box thread portion, each box thread portion having a plurality of box threads, each box thread having a root, a crest, a stab flank, and a load flank; the depth of each box thread determined by the distance between the root and the crest, and the width between each box thread determined by the distance between the stab flank and the load flank of adjacent box threads. According to one embodiment, the crests of adjacent box threads align along a box taper plane that is angled relative to the central axis of the connection, the roots of adjacent box threads of the run-in box thread portion align along a box run-in plane that is angled relative to the central axis of the connection and the box taper plane, the roots of adjacent box threads of the perfect box thread portion aligned along a box perfect plane that is substantially parallel to the box taper plane, and the roots of adjacent box threads of the run-out box thread portion align along a box run-out plane that is angled relative to the central axis of the connection and the box taper plane.

In addition, the pin threads and the box threads are arranged so that when the connection is fully made up, the threads of the run-in pin thread portion engage the threads of the run-out box thread portion, the threads of the perfect pin thread portion engage the threads of the perfect box thread portion, the threads of the run-out box thread portion engage the threads of the run-in pin thread portion, the external pin seal surface sealingly engages the external box seal surface, and the internal pin seal surface sealingly engages the internal box seal surface. Furthermore, the width of the pin threads is slightly greater than the width between corresponding box threads, so that as the pin threads engage with the box threads, an interference fit is created between the pin threads and the box threads to limit axial movement in the connection under tension and compression and reduce deformation of the seals during full compression.

According to another embodiment of the invention, the pin further includes a pin internal seal diameter, and a pin internal seal thickness. The ratio of the pin internal seal diameter to the pin internal seal thickness can range from about sixteen to about sixty six.

According to yet another embodiment of the invention, the crests of at least a portion of the box threads can be curved so that when the pin threads are fully engaged with the box threads, there is a void between the roots of the pin threads and the corresponding curved crests of the box threads to reduce standoff caused by lubricant or other fluids becoming trapped between the threads as the connection is made up.

An alternate embodiment of the present invention provides a threaded connection for connecting two pipes, each pipe having a substantially similar pipe outer diameter and pipe thickness, the threaded connection having a straight central axis. The connection includes a pin having an external pin seal surface, an internal pin seal surface, a pin internal seal diameter, and a pin internal seal thickness. The external and internal pin seal surfaces are separated by a run-in pin thread portion, a perfect pin thread portion, and a run-out pin thread portion, each pin thread portion having a plurality of pin threads, each pin thread having a root, a crest, a stab flank, and a load flank.

The connection further includes a box having an internal box seal surface and an external box seal surface, the external and internal box seal surfaces separated by a run-in box thread portion, a perfect box thread portion, and a run-out box thread portion, each box thread portion having a plurality of box threads, each box thread having a root, a crest, a stab flank, and a load flank.

According to certain embodiments, the pin threads and the box threads are arranged so that when the connection is fully made up, the threads of the run-in pin thread portion engage the threads of the run-out box thread portion, the threads of the perfect pin thread portion engage the threads of the perfect box thread portion, the threads of the run-out box thread portion engage the threads of the run-in pin thread portion, the external pin seal surface sealingly engages the external box seal surface, and the internal pin seal surface sealingly engages the internal box seal surface. In addition, the ratio of the pin internal seal diameter to the pin internal seal thickness is about 1.3 to about 6.3 times as great as the ratio of the pipe outer diameter to the pipe thickness.

According to alternate embodiments, the roots of adjacent pin threads align along a pin taper plane that is angled relative to the central axis of the connection, the crests of adjacent pin threads of the run-in pin thread portion align along a pin run-in plane that is angled relative to the central axis of the connection and the pin taper plane, the crests of adjacent threads of the perfect pin portion align along a pin perfect plane that is substantially parallel to the pin taper plane, and the crests of adjacent pin threads of the run-out pin thread portion align along a pin run-out plane that is substantially parallel to the central axis of the connection, and angled relative to the pin taper plane. Similarly, the crests of adjacent box threads can align along a box taper plane that is angled relative to the central axis of the connection, the roots of adjacent box threads of the run-in box thread portion can align along a box run-in plane that is angled relative to the central axis of the connection and the box taper plane, the roots of adjacent box threads of the perfect box thread portion can align along a box perfect plane that is substantially parallel to the box taper plane, and the roots of adjacent box threads of the run-out box thread portion can align along a box run-out plane that is angled relative to the central axis of the connection and the box taper plane.

In other example embodiments, the width of the pin threads can be slightly greater than the width between adjacent box threads, so that as the pin threads engage with the box threads, an interference fit is created between the pin threads and the box threads to limit axial movement in the connection under tension and compression and reduce deformation of the seals during full compression. Further, the crests of at least a portion of the box threads can be curved so that when the pin threads are fully engaged with the box threads, there is a void between the root of the pin threads and the corresponding curved crests of the box threads to reduce standoff caused by lubricant or other fluids becoming trapped between the threads as the connection is made up.

Another alternate embodiment of the present invention provides a threaded connection having a straight central axis. The connection includes a pin having an external pin seal surface and an internal pin seal surface, the external and Internal pin seal surfaces separated by a run-in pin thread portion, a perfect pin thread portion, and a run-out pin thread portion, each pin thread portion having a plurality of pin threads, each pin thread having a root, a crest, a stab flank, and a load flank. The connection also includes a box having as internal box seal surface and an external box seal surface, the external and internal box seal surfaces separated by a run-in box thread portion, a perfect box thread portion, and a run-out box thread portion, each box thread portion having a plurality of box threads, each box thread having a root, a crest, a stab flank, and a load flank.

The pin threads and the box threads are arranged so that when the connection is fully made up, the threads of the run-in pin thread portion engage the threads of the run-out box thread portion, the threads of the perfect pin thread portion engage the threads of the perfect box thread portion, the threads of the run-out box thread portion engage the threads of the run-in pin thread portion, the external pin seal surface sealingly engages the external box seal surface, and the internal pin seal surface sealingly engages the internal box seal surface. In addition, the crests of at least a portion of the box threads being curved so that when the pin threads are fully engaged with the box threads, there is a void between the roots of the pin threads and the corresponding curved crests of the box threads to reduce standoff caused by lubricant or other fluids becoming trapped between, the threads as the connection is made up.

In some embodiments, the roots of adjacent pin threads can align along a pin taper plane that is angled relative to the central axis of the connection, the crests of adjacent pin threads of the run-in pin thread portion can align along a pin run-in plane that is angled relative to the central axis of the connection and the pin taper plane, the crests of adjacent pin threads of the perfect pin portion can align along a pin perfect plane that is substantially parallel to the pin taper plane, and the crests of adjacent pin threads of the run-out pin thread portion can align along a pin run-out plane that is substantially parallel to the central axis of the connection, and angled relative to the pin taper plane. Similarly, the crests of adjacent box threads can align along a box taper plane that is angled relative to the central axis of the connection, the roots of adjacent box threads of the run-in box thread portion can align along a box run-in plane that is angled relative to the central axis of the connection and the box taper plane, the roots of adjacent box threads of the perfect box thread portion cat align along a box perfect plane that is substantially parallel to the box taper plane, and the roots of adjacent box threads of the run-out box thread portion can align along a box run-out plane that is angled relative to the central axis of the connection and the box taper plane.

According to some alternate embodiments, the width of the pin threads can be slightly greater than the width between adjacent box threads, so that as the pin threads engage with the box threads, an interference fit is created between the pin threads and the box threads to limit axial movement in the connection under tension and compression and reduce deformation of the seals during full compression. In addition, the pin can further include a pin internal seal diameter, and a pin internal seal thickness, and the ratio of the pin internal seal diameter to the pin internal seal thickness can range from about sixteen to about sixty six.

BRIEF DESCRIPTION OF THE DRAWINGS

The present technology will be better understood on reading the following detailed description of nonlimiting embodiments thereof, and on examining the accompanying drawings, in which:

FIG. 7 is a side cross-sectional view of the pin end of the threaded connection of FIG. 3;

FIG. 8 is an enlarged side cross-sectional view of example perfect threads of the pin end of the threaded connection shown in FIG. 7;

FIG. 11 is an enlarged side cross-sectional view of a portion of the threaded connection according to an embodiment of the present technology; and FIG. 12 is a side cross-sectional view of a semi-flush connection according to an alternate embodiment of the present technology.

DETAILED DESCRIPTION OF THE EXEMPLARY EMBODIMENTS

Figure 1:
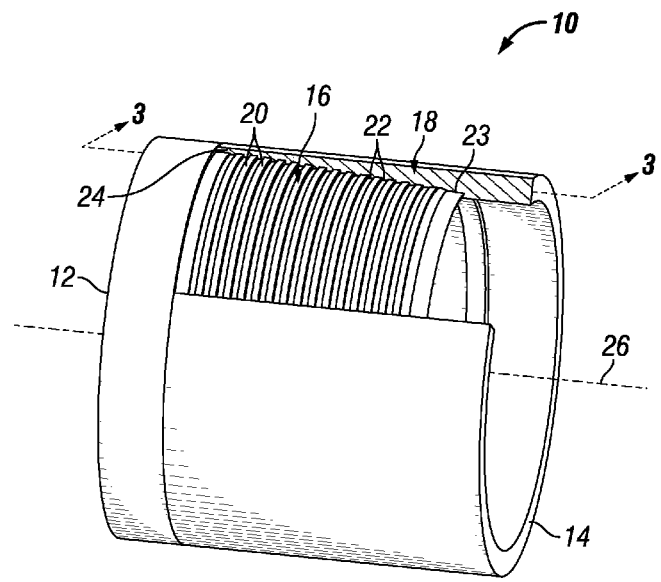
FIG. 1 is a perspective view of a threaded connection according to an embodiment of the present technology.

The foregoing aspects, features, and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. However, the embodiments are not intended to be limited to the specific terms used, and it is to be understood that each specific term includes equivalents that operate in a similar manner to accomplish a similar purpose.

FIG. 1 depicts an isometric perspective view of an integral flush threaded connection 10 according to an example embodiment of the present technology. As used herein, the term "integral flush connection" or "flush connection" is used to refer to a connection that is machined into a pipe body without adding any additional material or up-setting to help join two pieces of pipe, such that the outer diameter of the connection is flush with the outer diameter of the adjacent pipe sections and the inner diameter of the connection is also flush with the inner diameter of the adjacent pipe sections, as described more fully below. It should be appreciated that other connection types are possible while still complying with the principles disclosed herein. For example, in other embodiments the connection may be a flush connection, semi-flush connection, flush expandable connection, semi-flush expandable connection, or any other appropriate type of connection.

The connection 10 of the embodiment of FIG. 1 includes a first tubular member 12 and a second tubular member 14. The end portion of the first tubular member 12 is the pin 16, which is the male portion of the connection 10. The end portion of the second tubular member 14 is the box 18, which is the female portion of the connection 10. As shown, the pin 16 has pin threads 20 that correspond to box threads 22 such that the pin 16 and the box 18 can be threadedly engaged to make up the connection 10. When the connection 10 is fully made up, seal surfaces (shown and described in detail below) on the pin 16 and the box 18 interact to form an internal seal 23 and an external seal 24 between the pin 16 and the box 18, thereby preventing fluids, which flow through the first and second tubular members 12, 14 and the connection 10, from leaking. Throughout the description of the embodiments herein, the term "fluids" is meant to include both liquids and gases. It should be appreciated that in at least some embodiments, tubular members may comprise any suitable tabular member for rise within both industrial and non-industrial applications. For example, in some embodiments, tubular members comprise a commonly used tubular member in the oil and gas industry, such as, for example, casing pipe, production tubing, or drill pipe.

Figure 2:
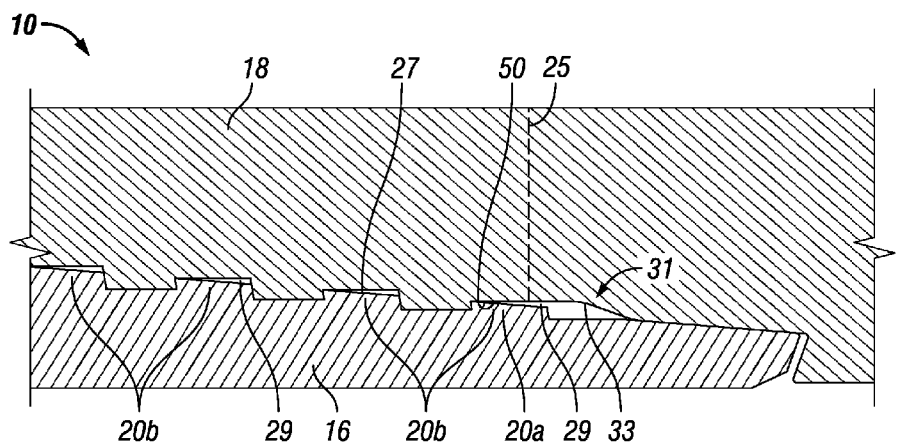
FIG. 2 is an enlarged cross-sectional view of the stress relieving threads of the threaded connection of FIG. 3 as indicated by area 2 of FIG. 3.

FIG. 2 shows an enlarged cross-sectional view of select pin threads 20 known as stress relieving threads 20b. Particularly shown in FIG. 2 is the last engaged thread 20a of the connection 10. This last engaged thread 20a is typically the weak point in the connection, and corresponds to the critical cross section of the box 18, indicated by plane 25. The stress relieving threads 20b perform two functions to reduce stresses at the critical cross section 25. First, the stress relieving threads 20b allow the material mass, or thickness of the box 18, at the critical cross section 25 to be increased (e.g., by providing additional clearance). Second, the stress relieving threads 20b reduce the stress being induced, by the pin 16 at the critical cross section 25 of the box 18 (e.g., by allowing the stress relieving threads 20b to deform in response to a tensile load on the connection 10).

To accomplish these two functions, the stress relieving threads 20b have stress relieving thread crests 27 that taper inwardly from a larger diameter to a smaller diameter, as shown. These tapered stress relieving thread crests 27 provide clearance 29 between the tapered stress relieving thread crests 27 and corresponding box thread roots 50. This clearance 29 allows the stress relieving threads 20b to move and/or deform such that the entire tensile load is not transferred to the box thread roots 50. Thus, the stress relieving threads 20b act, in some embodiments, like a spring or damper to gently apply the tensile load, and evenly distribute the resulting stresses through the connection 10. In some embodiments, the stress relieving threads can increase the tension efficiency of the connection 10 to 87% or greater.

Referring still to FIG. 2, there is shown a stress relief groove 31 that can be located on the box 18. The stress relief groove 31 can be located adjacent the critical cross section 25 of the box 18, and includes a smooth carved or radiused surface 33. In embodiments where the stress relief groove 31 is present, the smooth curved nature of the surface 33 further reduces the stress concentration that is applied to this section of the box 18, which thereby farther increases the overall tension efficiency of the connection 10.

Figure 3:
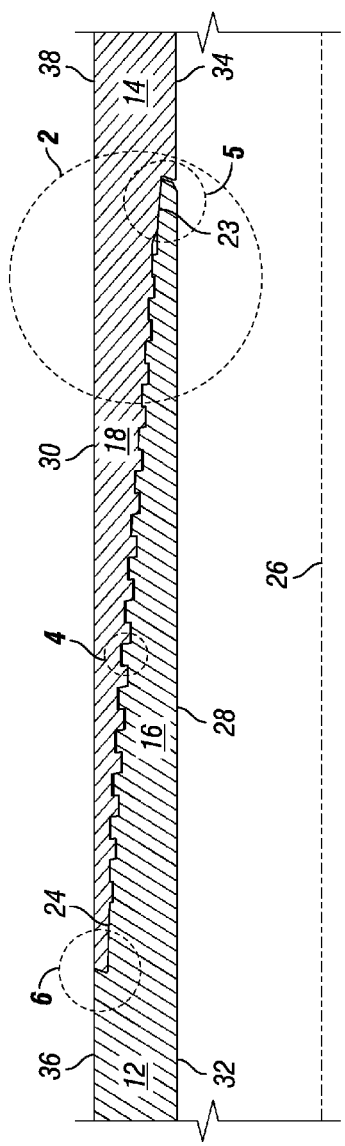
FIG. 3 is a side cross-sectional view of an integral flush threaded connection taken along line 3-3 of FIG. 1.

Referring now to FIG. 3, when the pin 16 is inserted within and threadly engaged with the box 18, the resulting connection 10 connects the tubular members 12, 14 to one another, and coaxially aligns each of the tubular members 12, 14 along a common central axis 26. In addition, the pin 14 includes a radially innermost cylindrical surface 28 while the box 18 includes a radially outermost cylindrical surface 30. Further, the tubular members 12, 14 each also include radially inmost cylindrical surfaces 32, 34, respectively, and radially outermost cylindrical surfaces 36, 38, respectively. In the specific implementation shown in FIG. 3, connection 10 is a flush connection, which is used herein to refer to a connection in which radially innermost and radially outermost surfaces are flush or co-planar with the corresponding radially innermost and outermost surfaces of the corresponding tubular members 12, 14. Thus, for the connection 10, the radially innermost surfaces 32, 28, 34 of the tubular member 12, pin 14, and tubular member 14, respectively, are all flush (i.e., co-planar) with one another. Similarly, the radially outermost surfaces 36, 30, 38 of the tubular member 12, box 18, and tubular member 14, respectively, are all flush (i.e., co-planar) with one another when the connection 10 is fully made up in the manner shown in FIG. 3.

Figure 4:
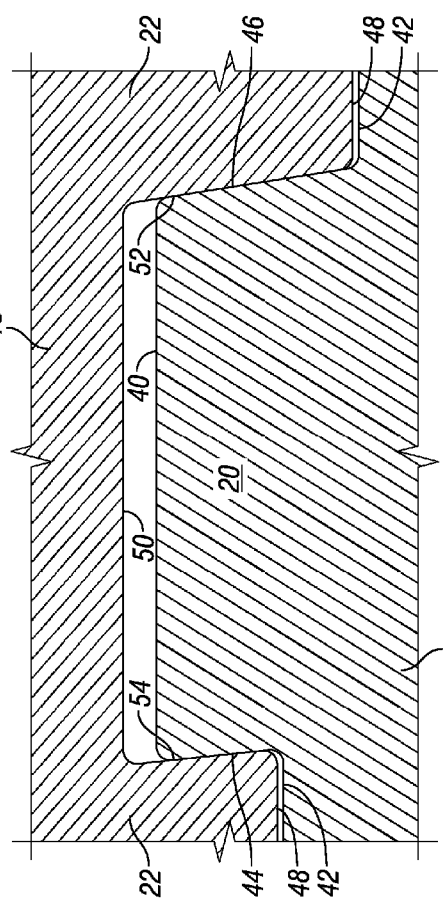
FIG. 4 is an enlarged side cross-sectional view of a portion of the threaded connection indicated by area 3 of FIG. 3.

FIG. 4 depicts an individual pin thread 20, and portions of adjacent box threads 22, and serves to illustrate certain features of the threads. As shown, each pin thread 20 includes a pin thread crest 40, a pin thread root 42, a pin thread load flank 44, and a pin thread stab flank 46. Similarly, each box thread 22 includes a box thread crest 48, a box thread root 50, a box thread load flank 54, and a box thread stab flank 52. In the embodiment shown in FIG. 4, the connection 10 is fully made up. The width (i.e., the distance between the load flank and the stub flank of each thread) of the threads 20, 22 is such that there is interference between the load flanks 44 of the pin threads 20 and the stab flanks 52 of the box threads 22. Such interference between the load flanks 44 and the stab flanks 52 can be, in some embodiments, as small as 0.0005 or less. At the same time, the depth (i.e., the distance between the crest and root of each thread), of the threads 20, 22 is such that there is no interference between the crests 40 of the pin threads 20 and the roots 48 of the box threads 22, or vice versa. The flank to flank interference shown in FIG. 4 is advantageous because it reduces linear or axial movement in the connection 10 under tension and compression, which will save the seals from permanent deformation during full compression. This is achieved by the stab flank of a given thread taking the full load under compression, and not allowing the pin or box to move relative to one another, which would cause additional stress on the seal.

Figure 5:
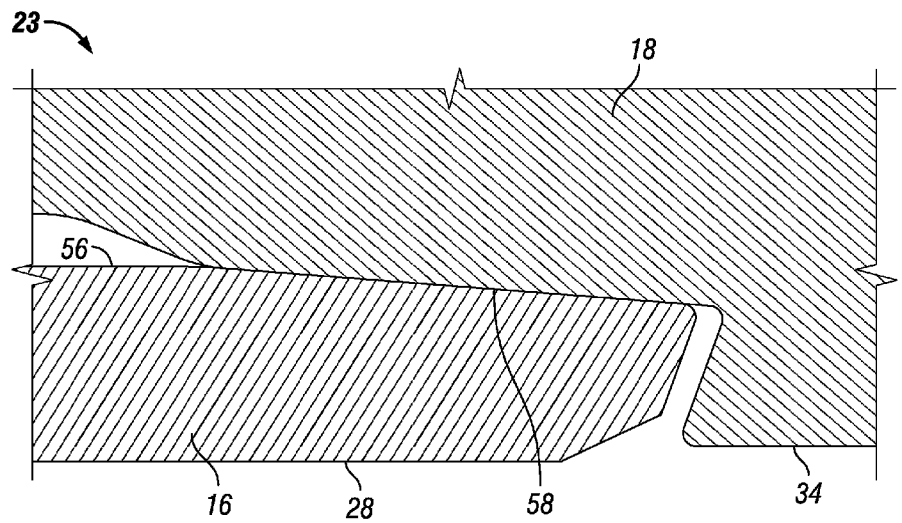
FIG. 5 is an enlarged side cross-sectional view of a portion of the threaded connection indicated by area 5 of FIG. 3.

FIG. 5 shows an enlarged view of the internal seal 23 of the connection 10 in an energized state when the connection 10 is fully made up. As can be seen, the internal seal 23 is created when an internal pin seal surface 56 of the pin 16 contacts an internal box seal surface 58 of the box 18. In an unenergized state the internal pin seal surface 56 is radially spaced from the innermost cylindrical surface 28 of the pin 16. Similarly, in the unenergized state the internal box seal surface 58 is radially spaced from the outermost cylindrical surface 30 of the box 18. When the threads 20, 22 of the pin 16 and the box 18, however, are fully engaged, the internal pin seal surface 56 and the internal, box seal surface 58 come into interference and are energized. This interference causes one or both of the pin 16 and/or the box 18 to deform, and the seal surfaces 56, 58 to be tightly pressed so that no fluid can leak through the seal. In the embodiment shown in FIG. 5, the internal pin seal surface 56 and internal box seal surface 58 are metal, so that the internal seal 23 is a metal-to-metal seal. In alternate embodiments, however, one or both internal pin and box seal surfaces 56, 58 could be coated wills a coating to reduce galling which may, for example, help to increase sealability.

Figure 6:
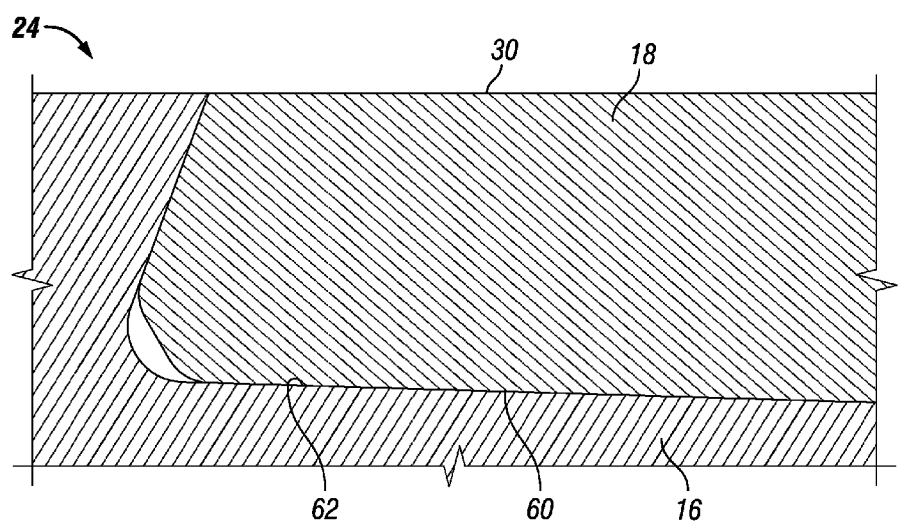
FIG. 6 is an enlarged side cross-sectional view of a portion of the threaded connection indicated by area 6 of FIG. 3.

FIG. 6 shows an enlarged view of the external seal 24 of the connection 10 in an energized state when the connection 10 is fully made up. As can be seen, the external seal 24 is created when an external box seal surface 60 of the box 18 contacts an external pin seal surface 62 of the pin 16. In an unenergized state the external box seal surface 60 is radially spaced from the outermost cylindrical surface 30 of the box 18. Similarly, in the unenergized state the external pin seal surface 62 is radially spaced from the innermost cylindrical surface 28 of the pin 16. When the threads 20, 22 of the pin 16 and the box 18, however, are fully engaged, the external box seal surface 60 and the external pin seal surface 62 come into interference and are energized. This interference causes one or both of the pin 16 and/or the box 18 to deform, and the seal surfaces 60, 62 to be tightly pressed so that no fluid can leak through the seal. In the embodiment shown in FIG. 6, the external box seal surface 60 and external pin seal surface 62 are metal, so that the internal seal 23 is a metal-to-metal seal. In alternate embodiments, however, one or both internal box and pin seal surfaces 60, 62 could be coated with a coating to reduce galling which may, for example, help to increase sealability.

Referring now to FIG. 7, an enlarged cross-sectional view of the pin 16 is shown. In addition to radially innermost cylindrical surface 28, previously described, pin 16 also includes a pin nose 64, a pin shoulder 66 extending radially inward from the radially outermost surface 36 of tubular member 12, as well as the previously described internal pin seal surface 56 extending substantially axially from the pin nose 64, the external pin seal surface 62 extending substantially axially from the pin shoulder 66, and the plurality of pin threads 20 between the internal and external pin seal surfaces 56, 62. As shown in FIG. 7, the pin shoulder 66 can be angled forward, so that the portion of the pin shoulder 66 flush with the radially outermost surface 36 extends beyond the base of the pin shoulder 66. Such an angled shoulder 66 gives the connection 10 a positive stop and stores additional torque in the connection 10 while being made up. The pin threads 20 are formed as a single, continuous groove in the pin 16, and generally correspond to run-in pin thread portion 68 adjacent the internal pin seal surface 56, a run-out pin thread portion 70 adjacent the external pin seal surface 62, and a perfect pin thread portion 72 between the run-in pin thread portion 68 and the run-out pin thread portion 70.

The pin internal seal thickness $T_P$ is the measure of the thickness of the pin 16 between the internal pin seal surface 56 and the radially inner most cylindrical surface 28. Typically the pin internal seal thickness $T_P$ is measured at the gauge point of the internal pin seal surface 56. The ratio of the pin internal seal thickness $T_P$ to the pin internal seal diameter $D_P$ can be compared to a corresponding ratio of the tubular member thickness $T_{TM}$ to tubular member outer diameter $D_{TM}$. Such ratio can be applied to pipes of differing size, weights, grades, etc. to help achieve design consistency across the product line. In the embodiments shown, the $D_P/T_P$ ratio can be about 1.3 to about 6.3 or greater times the $D_{TM}/T_{TM}$ ratio. Alternately, in other embodiments, the $D_P/T_P$ ratio can be about 16 to 66. Of course, such specific ratios and comparisons are exemplary only, and any appropriate dimensions can be used depending on the particular connection design.

The relative position of the pin thread root 42 of each pin thread 20 between the external pin seal surface 66 and the internal pin seal surface 56 is aligned along a pin taper plane 74 that is angled relative to the centerline 26 at an angle $\theta_P$.

Thus, as shown, the relative positions of the pin thread roots 42 of the pin threads 20 taper inward toward the centerline 26 from the external pin seal surface 66 to the internal pin seal surface 56. In some embodiments, the angle $\theta_P$ may preferably range from about 3° to 4° depending on the overall size and pitch of connection; however, other values are possible.

The relative position of each pin thread crest 40 of each pin thread 20 in the run-in pin thread portion 68 is aligned along a pin run-in plane 76 that is angled relative to the centerline 26 at an angle $\Phi_P$. Thus, the relative positions of the pin thread crests 40 of the pin threads 20 of the run-in pin thread portion 68 taper radially inward toward the centerline 26 from the perfect pin thread portion 72 to the internal pin seal surface 56 along the pin run-in plane 76. In the embodiment of FIG. 7, the angle $\Phi_P$ may preferably range between about 4° to 5° relative to the centerline 26, depending on the overall size and pitch of the connection 10; however, other angle values are possible. For example, in some embodiments, the angle $\Phi_P$ may range from 2° to 5° while still complying with the principles disclosed herein. Thus, the angle $\Phi_P$ of the pin run-in plane 76 is greater than the angle $\theta_P$ of the pin taper plane 74, such that the pin thread crests 40 of the run-in pin thread portion 68 taper more steeply inwardly toward the centerline 26 than the pin thread roots 42 of that portion. The pin thread roots 42 of each of the pin threads 20 in the run-in pin thread portion 68 are parallel to the centerline 26.

The relative position of each pin thread crest 40 of each pin thread 20 in the perfect pin thread portion 72 is aligned along a pin perfect plane 78 that is substantially parallel to the pin taper plane 74, and that is thus angled relative to the centerline 26 at the angle $\theta_P$. The relative positions of the pin thread crests 40 of the pin threads 20 of the perfect pin thread portion 72 taper radially inward toward the centerline 26 from the run-out pin thread portion 70 to the run-in pin thread portion 68 along the pin perfect plane 78. In some example embodiments, the taper of the pin perfect plane is dependent on the diameter and wall thickness of the tubular members. For example, if the tubular members have an outside diameter to wall thickness ratio of about twenty, then the pin perfect plane of the cross-section shown in FIG. 7 could taper at a rate of about 0.0673 inches per linear inch. Alternately, if the tubular members have an outside diameter to wall thickness ratio of about fourteen, then the pin perfect plane of the cross-section shown in FIG. 7 could taper at a rate of about 0.0550 inches per linear inch. Of course, the pin perfect plane can have other tapers not specifically disclosed herein, depending on the particular design of each connection.

The relative position of the pin thread crest 40 of each pin thread 20 in the run-out pin thread portion 70 is aligned along a pin run-out plane 80 that is substantially parallel to the centerline 26. In addition, each of the individual pin thread crests 40 and pin thread, roots 42 of the run-out pin thread portion 70 may be oriented parallel to the centerline, although the relative position of adjacent pin thread roots 42 varies along the pin taper plane 74.

Referring now to FIG. 8, there is shown an enlarged partial cross-sectional view of a plurality of pin threads 20 located in the perfect pin thread portion 72. Each pin thread 20 includes a pin thread crest 40, a pin thread root 42, a pin thread load flank 44, and a pin thread stab flank 46. In this embodiment, and along this portion of the pin 16, each of the pin thread crests 40 and pin thread roots 42 are oriented parallel, to the centerline 26. For clarity, a representative centerline 26A is shown in close proximity to pin threads 20 rather than the actual centerline, to allow the relative angles of each component and/or feature of the pin threads 20 to be referenced. Representative center/line 26A is parallel to centerline 26, and thus, all relative angles to representative centerline 26A will be the same as for centerline 26.

As shown in FIG. 8, each pin thread stab flank 46 is oriented at an angle $\alpha_P$ relative to a perpendicular plane 82 extending perpendicularly to representative centerline 26A, while each pin thread load flank 44 is oriented at an angle $\beta_P$ relative to the perpendicular plane 82. In at least some embodiments, the absolute value of the angle $\alpha_P$ is greater than the absolute value of the angle $\beta_P$. Further, in the embodiment shown in FIG. 8, the angle $\alpha_P$ of the pin thread stab flank 46 can be about 9°, while the angle $\beta_P$ of the pin thread load flank 44 can be about −5°. It may provide an advantage to have the angle of the pin thread stab flank 46 be greater than the angle $\beta_P$ of the pin thread load flank 44 to allow for clearance during makeup of the connection. Any acceptable angle, however, may be used in either case. For example, in some embodiments the values for the angle $\alpha_P$ may range from 9° to 20° and the values for the angle $\beta_P$ may range from, −4° to 9° while still complying with the principles disclosed herein. In alternative embodiments, these angles could be changed for any reason, such as, for example, for ease of manufacturing.

Furthermore, and also as shown in FIG. 8, each of the transitions between the pin thread surfaces can be radiused. For example, the transition between the pin thread crest 40 and the pin thread stab flank 46 for the shown threads can have a specified radius of curvature $R_{P1}$, the transition between pin thread crest 40 and pin thread lead flank 44 can have a radius of curvature $R_{P2}$, the transition between the pin thread root 42 and the pin thread load flank 44 can have a radius of curvature $R_{P3}$, and the transition between the pin thread root 42 and the pin thread load flank 46 can have a radius of curvature $R_{P4}$. It should be appreciated that all other threads along pin 16 can be are similarly radiused between each pair of adjacent intersecting surfaces. The radiused transitions described herein are advantageous because the help to guide the pin threads 20 and box threads 22 as they engage during makeup of the connection 10. In addition, the radiused transitions help to reduce galling, improve safety for personnel handling the components of the connection, and increase fatigue life because they reduce or eliminate stress concentrations that would otherwise occur in sharp corners.

Figure 9:
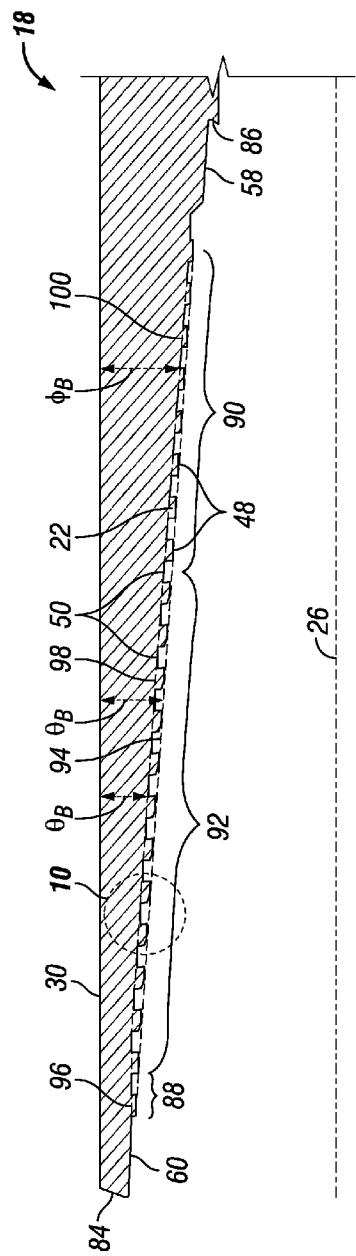
FIG. 9 is a side cross-sectional view of the box end of the threaded connection of FIG. 3.

FIG. 9 shows an enlarged cross-sectional view of the box 16 including box threads 22, which extend between the internal box seal surface 58 and the external box seal surface 60. In addition to the radially outermost cylindrical surface 39, described above, box 18 also includes a box shoulder 84, as well as the previously described external box seal surface 58 extending substantially axially item the box shoulder 84, the internal box seal surface 58, and the plurality of box threads 22 between the external and internal box seal surfaces 60, 58. In some embodiments, this angle may be slightly different titan the angle of the pin shoulder 66. Such a difference in angles can help to prevent yielding of the pin shoulder 66, and can help to engage the external seal. The box threads 22 are formed as a single, continuous groove in die box 18, and generally correspond to run-in box thread portion 88 adjacent the external box seal surface 60, a run-out box thread portion 90 adjacent the internal box seal surface 58, and a perfect box thread portion 92 between the run-in box thread portion 88 and the run-out box thread portion 90.

The relative position of each box thread crest 48 of each box thread 22 between the external box seal surface 60 and the internal box seal surface 58 is aligned along a box taper plane 94 that is angled relative to the centerline 26 at an angle $\theta_B$ (the centerline 26 is substantially parallel to the radially outermost cylindrical surface 30). Thus, as shown, the relative positions of the box thread crests 48 of the box threads 22 taper inward toward the centerline 26 from the external box seal surface 60 to the internal box seal surface 58. In some embodiments, the angle $\theta_B$ may preferably range from about 3° to 4° depending on the overall size and pitch of connection; however, other values are possible. For example, in some embodiments, the angle $\theta_B$ may range from 1.5 to 6 while still complying with the principles disclosed herein.

The relative position of each box thread root 50 of each box thread 22 in the run-in box thread portion 88 is aligned along a box run-in plane 96 that is substantially parallel to the centerline 26. In addition, each of the individual box thread roots 50 and pin thread crests 48 of the run-in box thread portion 88 may be oriented parallel to the centerline, although the relative position of adjacent box thread crests 48 varies along the box taper plane 94.

The relative position of each box thread root 50 of each box thread 22 in the perfect box thread portion 92 is aligned along a box perfect plane 98 that is substantially parallel to the box taper plane 94, and that is thus angled relative to the centerline 26 at the angle $\theta_B$. The relative positions of the box thread roots 50 of the box threads 22 of the perfect box thread portion 92 taper radially inward toward the centerline 26 from the run-in box thread portion 60 to the run-out box thread portion 58 along the box perfect plane 98.

The relative-position of each box thread root 50 of each box thread 22 in the run-out box thread portion 90 is aligned along a box run-out plane 100 that is angled relative to the centerline 26 at an angle $\Phi_B$. Thus, the relative positions of the box thread roots 50 of the box threads 22 of the run-out box thread portion 98 taper radially inward toward the centerline 26 from the perfect box thread portion 92 to the internal box seal surface 58 along the box run-out plane 100. In the embodiment of FIG. 9, the angle $\Phi_B$ may preferably range between about 4° to 5° relative to the centerline 26, depending on the overall size and pitch of the connection 10; however, other angle values are possible. For example, in some embodiments, the angle $\Phi_B$ may range from 3 to 8 while still complying with the principles disclosed herein. Thus, the angle $\Phi_B$ of the box run-out plane 100 is greater than angle $\theta_B$ of the box taper plane 94, such that the box thread roots 50 of the run-out box thread portion 90 taper more steeply inwardly toward the centerline 26 than the box thread crests 48 of that portion. While each of the box thread roots 50 have a relative position along its respective plane, depending on whether it corresponds to the run-in box thread portion 88, the perfect box thread portion 92, or the run-out box thread portion 90, each of the individual box thread roots 50 is oriented substantially parallel to the centerline 26.

Figure 10:
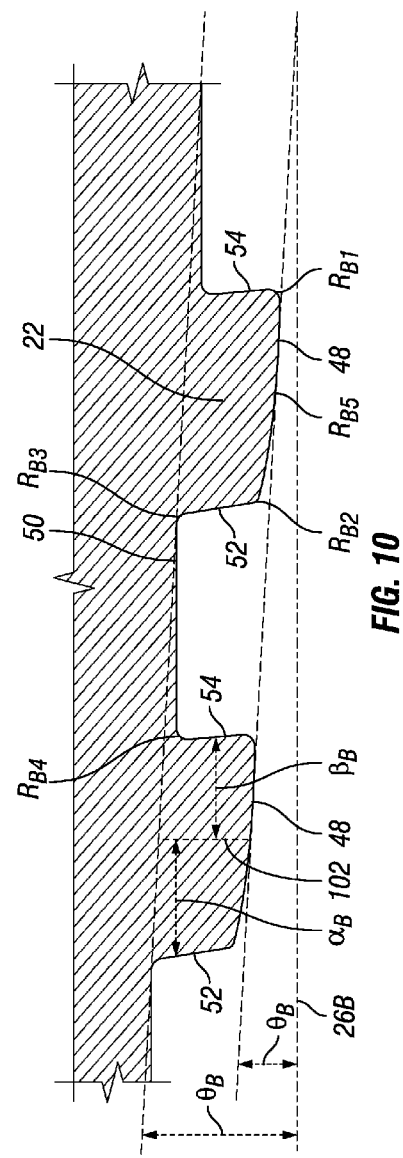
FIG. 10 is an enlarged side cross-sectional view of example threads of the box end of the threaded connection shown in FIG. 9.
Figure 13:
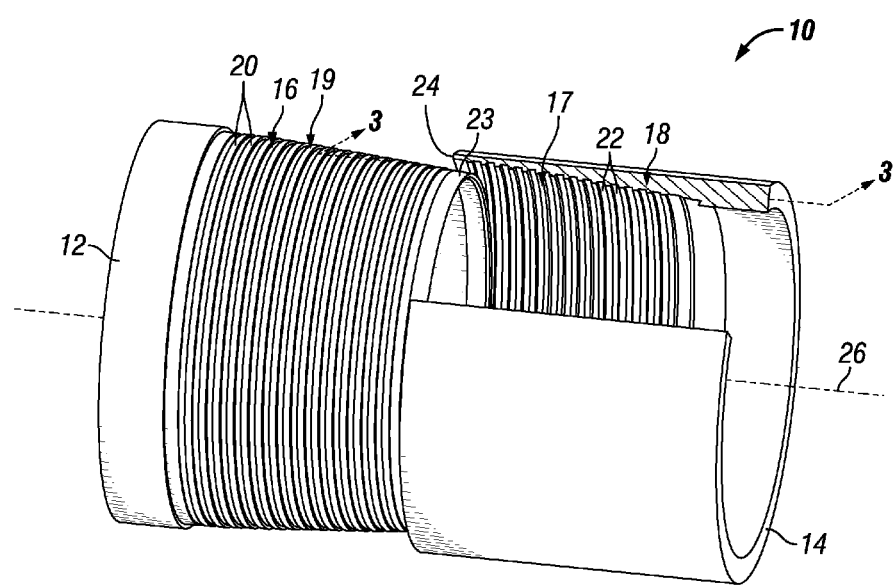
FIG. 13 is a perspective view of the threaded connection of FIG. 1 in an unenergized state with box internal seal diameter 17 and pin external seal diameter 19.

Referring now to FIG. 10, there is shown an enlarged partial cross-sectional view of a plurality of box threads 22 located in the perfect box thread portion 92. Each box thread 22 includes a box thread crest 48, a box thread root 50, a box thread load flank 54, and a box thread stab hank 52. In the embodiment of FIG. 10, and along the portion of the box 16 shown, each of the box thread crests 48 are oriented parallel to the centerline 26. For clarity, a representative centerline 26B is shown in close proximity to pin threads 22 rather than the actual centerline, to allow the relative angles of each component and/or feature of the pin threads 20 to be referenced. Representative centerline 26B is parallel to centerline 26, and thus, all relative angles to representative centerline 26B will be the same as for centerline 26.

As shown in FIG. 10, each box thread stab flank 52 is oriented at an angle $\alpha_B$ relative to a perpendicular plane 102 extending perpendicularly to representative centerline 26B, while each box thread load flank 54 is oriented at an angle $\beta_B$ relative to the perpendicular plane 82. In at least some embodiments, the absolute value of the angle $\alpha_B$ is greater than the absolute value of the angle $\alpha_B$. Further, in the embodiment shown in FIG. 10, the angle $\alpha_B$ of the box thread stab flank 52 can be about 9°, while the angle $\beta_B$ of the box thread load flank 54 can be about −5°. It may provide an advantage to have the angle $\alpha_B$ of the box thread stab flank 52 be greater than the angle $\beta_B$ of the box thread load flank 54 to allow for clearance during makeup of the connection. Any acceptable angle, however, may be used in either case. For example, in some embodiments the values for the angle may range from 1.5 to 6 and the values for the angle $\beta_B$ may range from 3 to 8, while still complying with the principles disclosed herein.

Furthermore, and also as shown in FIG. 10, each of the transitions between the box thread surfaces can be radiused. For example, the transition between the box thread crest 48 and the box thread stab flank 52 for the shown threads can have a specified radius of curvature $R_{B2}$, the transition between box thread crest 48 and box thread load flank 54 can have a radius of curvature $R_{B1}$, the transition between the box thread root 50 and the box thread load flank 54 can have a radius of curvature $R_{B4}$, and the transition between the box thread root 50 and the box thread stab flank 52 can have a radius of curvature $R_{B3}$. It should, be appreciated that all other threads along box 18 can be similarly radiused between each pair of adjacent intersecting surfaces. The radiused transitions described herein are advantageous because the help to guide the pin threads 20 and box threads 22 as they engage during makeup of the connection 10. In addition, the radiused transitions help to reduce galling, improve safety for personnel handling the components of the connection, and increase fatigue life because they reduce or eliminate stress concentrations that would otherwise occur in sharp corners.

In addition, and as will be discussed in more detail below, the box thread crest 48 of each box thread 22 can also be radiused or curved, rather than planar as is the case for the pin thread crests 40 of pin threads 20. In particular, each box thread crest 48 is shown to have a radius of curvature $R_{B5}$ extending across the width of the box thread 22. The radius of curvature $R_{B5}$ varies with each box thread 22 depending on the lead of the thread. The lead of each thread is the distance from a point on the thread to the corresponding point on an adjacent thread. In one embodiment, the depth of the box thread bad flank 54 is equal to the lead multiplied by about 0.168 (lead*0.168). The depth of the box thread stab flank 52 is equal, to the depth of the box thread bad flank 54 multiplied by about 0.986 (depth, of box thread, load flank 54*0.986). In such an embodiment, the radius of curvature $R_{B5}$ of the box thread crest 48 is equal to half the product of the lead multiplied by 2.357 ((lead*2.357)/2).

The curvature of box thread crests 48 allows tor the creation of a void 104 (shown and discussed in greater depth in FIG. 11) between each box thread crest 48 and a corresponding pin thread root 42 when the connection 10 is fully made up. Such a void 104 provides a place for fluids, such as lubricating fluid, or pipe dope, to gather, thereby reducing the problem of hydraulic lock and standoff. In addition, the radiused box thread crests 48 allow for a deeper stab when the connection 10 is made up, thereby reducing the number of turns necessary during makeup. This in turn leads to reduced galling risk of the seal surfaces, leading to a better seal between seal surfaces. In certain embodiments, the cross-sectional area of the void 104 can be about 0.0019 in². The void 104 can have a volume over the course of the entire connection of about 0.744 in³.

Referring again to FIG. 3, when the pin 16 and box 18 are fully made up, the internal pin seal surface 56 and internal box seal surface 58 sealingly engage one another to restrict fluid from flowing between the interior of tubular members 12, 14 and connection 10. Similarly, the external pin seal surface 62 and external box seal surface 60 sealingly engage one another to restrict fluid from flowing between the connection 10 and the exterior of tubular members 12, 14. In addition, when pin 16 and the box 18 are fully made up, the pin threads 20 of the run-in pin thread portion 68 engage the box threads 22 of the run-out box thread portion 90, the pin threads 20 of the perfect pin thread portion 72 engage the box threads 22 of the perfect box thread portion 92, and the pin threads 20 of the run-out pin thread portion 70 engage the box threads 22 of the run-in box thread portion 88. It should be noted that the pitch of the pin threads 20 is the same as the pitch for the corresponding box threads 22.

Referring now to FIG. 11, there is depicted an enlarged cross-sectional view of the engaged pin threads 20 and box threads 22 of the perfect pin and box thread, portions 72, 90. Each of the threads is fully engaged along the flanks. In some embodiments, as discussed above with reference to FIG. 4, there can be an interference fit between the flanks of the pin threads 20 and the flanks of the box threads 18. Thus, pin threads 20 and box threads 22 can have flank-to-flank interference with one another upon full makeup of the connection 10.

In addition, FIG. 11 depicts the curvature of the box thread crest 48 which creates a void 104 between the threads when the connection 10 is made up. Among other purposes and functions, the void 104 provides clearance for fluids (e.g., pipe dope or lubricants) to flow therethrough during final makeup of connection.

In some embodiments, the connection 10 may not be formed as an integral flush connection 10, such as is shown in FIG. 3 and described above. Instead, in other implementations, the technology disclosed herein may be implemented in other types of connections, such as, for example, the semi-flush connection 110 shown in FIG. 12. Connection 110 may generally include a pin 116 disposed on one end of a first tubular member 112, and a corresponding box 118 disposed on an end of a second tubular member 114. One difference between the semi-flush connection 110 shown in FIG. 12, however, and the connection 10 shown and described above, is that the radial outermost surface 130 of the semi-flush connection is not flush with outer surfaces 136, 138 of the first and second tubular members 112, 114, respectively. All of the features shown and described above, however, with respect to the pin and box threads and seals may still be included in the semi-flush connection 110 shown in FIG. 12.

Although the technology herein has been described with reference to particular embodiments, it is to be understood that these embodiments are merely illustrative of the principles and applications of the present technology. It is therefore to be understood that numerous modifications can be made to the illustrative embodiments and that other arrangements can be devised without departing from the spirit and scope of the present technology as defined by the appended claims.

What is claimed is:

1. A threaded connection having a straight central axis, the connection comprising:
a pin having an external pin seal surface and an internal pin seal surface, the external and internal pin seal surfaces separated by a run-in pin thread portion, a perfect pin thread portion, and a run-out pin thread portion, each pin thread portion having a plurality of pin threads, each pin thread having a root, a crest, a stab flank, and a load flank, the depth of each pin thread determined by the distance between the root and the crest, and the width of each pin thread determined by the distance between the stab flank and the load flank, wherein each stab flank is angled between 9° and 20° relative to a plane perpendicular to the straight central axis and toward the external pin seal surface, wherein each load flank is angled between −4° to −9° relative to the plane perpendicular to the straight central axis and toward the external pin seal surface, and wherein for each pin thread an absolute value of the angle of the stab flank is greater than an absolute value of the angle of the load flank;
the roots of adjacent pin threads aligned along a pin taper plane that is angled relative to the central axis of the connection;
the crests of adjacent pin threads of the run-in pin thread portion aligned along a pin run-in plane that is angled relative to the central axis of the connection and the pin taper plane;
the crests of adjacent pin threads of the perfect pin thread portion aligned along a pin perfect plane that is substantially parallel to the pin taper plane; and
the crests of adjacent pin threads of the run-out pin thread portion aligned along a pin run-out plane that is substantially parallel to the central axis of the connection, and angled relative to the pin taper plane;
a box having an internal box seal surface and an external box seal surface, the external and internal box seal surfaces separated by a run-in box thread portion, a perfect box thread portion, and a run-out box thread portion, each box thread portion having a plurality of box threads, each box thread having a root, a crest, a stab flank, and a load flank, the depth of each box thread determined by the distance between the root and the crest, and the width between each box thread determined by the distance between the stab flank and the load flank of adjacent box threads;
the crests of adjacent box threads aligned along a box taper plane that is angled relative to the central axis of the connection;
the roots of adjacent box threads of the run-in box thread portion aligned along a box run-in plane that is parallel to the central axis of the connection and angled relative to the box taper plane;
the roots of adjacent box threads of the perfect box thread portion aligned along a box perfect plane that is substantially parallel to the box taper plane; and
the roots of adjacent box threads of the run-out box thread portion aligned along a box run-out plane that is angled relative to the central axis of the connection and the box taper plane;
the pin threads and the box threads arranged so that when the connection is fully made up, the threads of the run-in pin thread portion engage the threads of the run-out box thread portion, the threads of the perfect pin thread portion engage the threads of the perfect box thread portion, the threads of the run-out box thread portion engage the threads of the run-in pin thread portion, the external pin seal surface sealingly engages the external box seal surface, and the internal pin seal surface sealingly engages the internal box seal surface; and the width of the pin threads is slightly greater than the width between corresponding box threads, so that as the pin threads engage with the box threads, an interference fit is created between the pin threads and the box threads to limit axial movement in the connection under tension and compression and reduce deformation of the seals during full compression.

2. The threaded connection of claim 1, wherein the pin further comprises:
a pin internal seal diameter; and
a pin internal seal thickness,
the ratio of the pin internal seal diameter to the pin internal seal thickness ranging from sixteen to sixty six.

3. The threaded connection of claim 1, wherein the crests of at least a portion of the box threads are curved so that when the pin threads are fully engaged with the box threads, there is a void between the roots of the pin threads and the corresponding curved crests of the box threads, the void proceeding along the entire length of the pin thread root and the curved crest of the box thread between the pin thread root and the curved crest of the box thread, to reduce standoff caused by lubricant or other fluids becoming trapped between the threads as the connection is made up.

4. A threaded connection for connecting two pipes, each pipe having a substantially similar pipe outer diameter and pipe thickness, the threaded connection having a straight central axis, the connection comprising:
a pin comprising:
an external pin seal surface;
an internal pin seal surface;
a pin internal seal diameter; and
a pin internal seal thickness,
the external and internal pin seal surfaces separated by a run-in pin thread portion, a perfect pin thread portion, and a run-out pin thread portion, each pin thread portion having a plurality of pin threads, each pin thread having a root, a crest, a stab flank, and a load flank, wherein each stab flank is angled between 9° and 20° relative to a plane perpendicular to the straight central axis and toward the external pin seal surface, wherein each load flank is angled between −4° to −9° relative to the plane perpendicular to the straight central axis and toward the external pin seal surface, and wherein for each pin thread an absolute value of the angle of the stab flank is greater than an absolute value of the angle of the load flank; and
a box having an internal box seal surface and an external box seal surface, the external and internal box seal surfaces separated by a run-in box thread portion, a perfect box thread portion, and a run-out box thread portion, each box thread portion having a plurality of box threads, each box thread having a root, a crest, a stab flank, and a load flank;
the pin threads and the box threads arranged so that when the connection is fully made up, the threads of the run-in pin thread portion engage the threads of the run-out box thread portion, the threads of the perfect pin thread portion engage the threads of the perfect box thread portion, the threads of the run-out box thread portion engage the threads of the run-in pin thread portion, the external pin seal surface sealingly engages the external box seal surface, and the internal pin seal surface sealingly engages the internal box seal surface;
the ratio of the pin internal seal diameter to the pin internal seal thickness being 1.3 to 6.3 times as great as the ratio of the pipe outer diameter to the pipe thickness.

5. The threaded connection of claim 1, wherein the external pin seal surface is bounded by a pin thread at a first external pin surface end and a pin shoulder at a second external pin surface end, the second external pin surface end positioned relatively farther from the internal pin seal surface than the first external pin surface end, and
wherein the pin shoulder extends away from the external pin seal surface and the straight central axis at an acute angle relative to the external pin seal surface.

6. The threaded connection of claim 1, wherein the threaded connection has an unenergized state, in which the pin threads and the box threads are not fully engaged, and an energized state, in which the pin threads and the box threads are fully engaged,
wherein the external pin seal surface has a pin external seal diameter, the external box seal surface has a box internal seal diameter, and when the threaded connection is in the unenergized state the pin external seal diameter is larger than the box internal seal diameter, and
wherein when the threaded connection is in the energized state the external pin seal surface comes into interfering contact with the external box seal surface so that at least one of the external pin seal surface and the external box seal surface deform to form a press fit that prevents fluid from passing between the external pin seal surface and the external box seal surface.

7. The threaded connection of claim 4, wherein,
the roots of adjacent pin threads align along a pin taper plane that is angled relative to the central axis of the connection,
the crests of adjacent pin threads of the run-in pin thread portion align along a pin run-in plane that is angled relative to the central axis of the connection and the pin taper plane,
the crests of adjacent threads of the perfect pin thread portion align along a pin perfect plane that is substantially parallel to the pin taper plane, and
the crests of adjacent pin threads of the run-out pin thread portion align along a pin run-out plane that is substantially parallel to the central axis of the connection, and angled relative to the pin taper plane.

8. The threaded connection of claim 7, wherein,
the crests of adjacent box threads align along a box taper plane that is angled relative to the central axis of the connection,
the roots of adjacent box threads of the run-in box thread portion align along a box run-in plane that is parallel to the central axis of the connection and angled relative to the box taper plane,
the roots of adjacent box threads of the perfect box thread portion align along a box perfect plane that is substantially parallel to the box taper plane, and
the roots of adjacent box threads of the run-out box thread portion align along a box run-out plane that is angled relative to the central axis of the connection and the box taper plane.

9. The threaded connection of claim 4, wherein the width of the pin threads is slightly greater than the width between adjacent box threads, so that as the pin threads engage with the box threads, an interference fit is created between the pin threads and the box threads to limit axial movement in the connection under tension and compression and reduce deformation of the seals during full compression.

10. The threaded connection of claim 4, wherein the crests of at least a portion of the box threads are curved so that when the pin threads are fully engaged with the box threads, there is a void between the root of the pin threads and the corresponding curved crests of the box threads, the void proceeding along the entire length of the pin thread root and the curved crest of the box thread between the pin thread root and the curved crest of the box thread, to reduce standoff caused by lubricant or other fluids becoming trapped between the threads as the connection is made up.

11. The threaded connection of claim 4, wherein the external pin seal surface is bounded by a pin thread at a first external pin surface end and a pin shoulder at a second external pin surface end, the second external pin surface end positioned relatively farther from the internal pin seal surface than the first external pin surface end, and
wherein the pin shoulder extends away from the external pin seal surface and the straight central axis at an acute angle relative to the external pin seal surface.

12. The threaded connection of claim 4, wherein the threaded connection has an unenergized state, in which the pin threads and the box threads are not fully engaged, and an energized state, in which the pin threads and the box threads are fully engaged,
wherein the external pin seal surface has a pin external seal diameter, the external box seal surface has a box internal seal diameter, and when the threaded connection is in the unenergized state the pin external seal diameter is larger than the box internal seal diameter, and
wherein when the threaded connection is in the energized state the external pin seal surface comes into interfering contact with the external box seal surface so that at least one of the external pin seal surface and the external box seal surface deform to form a press fit that prevents fluid from passing between the external pin seal surface and the external box seal surface.

13. A threaded connection having a straight central axis, the connection comprising:
a pin having an external pin seal surface and an internal pin seal surface, the external and internal pin seal surfaces separated by a run-in pin thread portion, a perfect pin thread portion, and a run-out pin thread portion, each pin thread portion having a plurality of pin threads, each pin thread having a root, a crest, a stab flank, and a load flank, wherein each stab flank is angled between 9° and 20° relative to a plane perpendicular to the straight central axis and toward the external pin seal surface, wherein each load flank is angled between −4° to −9° relative to the plane perpendicular to the straight central axis and toward the external pin seal surface, and wherein for each pin thread an absolute value of the angle of the stab flank is greater than an absolute value of the angle of the load flank;
a box having an internal box seal surface and an external box seal surface, the external and internal box seal surfaces separated by a run-in box thread portion, a perfect box thread portion, and a run-out box thread portion, each box thread portion having a plurality of box threads, each box thread having a root, a crest, a stab flank, and a load flank;
the pin threads and the box threads arranged so that when the connection is fully made up, the threads of the run-in pin thread portion engage the threads of the run-out box thread portion, the threads of the perfect pin thread portion engage the threads of the perfect box thread portion, the threads of the run-out box thread portion engage the threads of the run-in pin thread portion, the external pin seal surface sealingly engages the external box seal surface, and the internal pin seal surface sealingly engages the internal box seal surface;
the crests of at least a portion of the box threads being curved so that when the pin threads are fully engaged with the box threads, there is a void between the roots of the pin threads and the corresponding curved crests of the box threads, the void proceeding along the entire length of the pin thread root and the curved crest of the box thread between the pin thread root and the curved crest of the box thread, to reduce standoff caused by lubricant or other fluids becoming trapped between the threads as the connection is made up.

14. The threaded connection of claim 13, wherein,
the roots of adjacent pin threads align along a pin taper plane that is angled relative to the central axis of the connection,
the crests of adjacent pin threads of the run-in pin thread portion align along a pin run-in plane that is angled relative to the central axis of the connection and the pin taper plane,
the crests of adjacent pin threads of the perfect pin thread portion align along a pin perfect plane that is substantially parallel to the pin taper plane, and
the crests of adjacent pin threads of the run-out pin thread portion align along a pin run-out plane that is substantially parallel to the central axis of the connection, and angled relative to the pin taper plane.

15. The threaded connection of claim 14, wherein,
the crests of adjacent box threads align along a box taper plane that is angled relative to the central axis of the connection,
the roots of adjacent box threads of the run-in box thread portion align along a box run-in plane that is parallel to the central axis of the connection and angled relative to the box taper plane,
the roots of adjacent box threads of the perfect box thread portion align along a box perfect plane that is substantially parallel to the box taper plane, and
the roots of adjacent box threads of the run-out box thread portion align along a box run-out plane that is angled relative to the central axis of the connection and the box taper plane.

16. The threaded connection of claim 13, wherein the width of the pin threads is slightly greater than the width between adjacent box threads, so that as the pin threads engage with the box threads, an interference fit is created between the pin threads and the box threads to limit axial movement in the connection under tension and compression and reduce deformation of the seals during full compression.

17. The threaded connection of claim 13, wherein the pin further comprises:
a pin internal seal diameter; and
a pin internal seal thickness,
the ratio of the pin internal seal diameter to the pin internal seal thickness ranging from sixteen to sixty six.

18. The threaded connection of claim 13, wherein the external pin seal surface is bounded by a pin thread at a first external pin surface end and a pin shoulder at a second external pin surface end, the second external pin surface end positioned relatively farther from the internal pin seal surface than the first external pin surface end, and wherein the pin shoulder extends away from the external pin seal surface and the straight central axis at an acute angle relative to the external pin seal surface.

19. The threaded connection of claim 13, wherein the threaded connection has an unenergized state, in which the pin threads and the box threads are not fully engaged, and an energized state, in which the pin threads and the box threads are fully engaged, wherein the external pin seal surface has a pin external seal diameter, the external box seal surface has a box internal seal diameter, and when the threaded connection is in the unenergized state the pin external seal diameter is larger than the box internal seal diameter, and wherein when the threaded connection is in the energized state the external pin seal surface comes into interfering contact with the external box seal surface so that at least one of the external pin seal surface and the external box seal surface deform to form a press fit that prevents fluid from passing between the external pin seal surface and the external box seal surface.

* * * * *